United States Patent
Suzuki et al.

(10) Patent No.: US 12,546,688 B2
(45) Date of Patent: Feb. 10, 2026

(54) KITS AND METHODS FOR SUPER-RESOLUTION MICROSCOPY

(71) Applicant: WISCONSIN ALUMNI RESEARCH FOUNDATION, Madison, WI (US)

(72) Inventors: Aussie Suzuki, Madison, WI (US); Mark E. Burkard, Cross Plains, WI (US); Roshan X. Norman, Madison, WI (US); Emma Recchia, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 648 days.

(21) Appl. No.: 17/466,434

(22) Filed: Sep. 3, 2021

(65) Prior Publication Data

US 2022/0074829 A1 Mar. 10, 2022

Related U.S. Application Data

(60) Provisional application No. 63/074,645, filed on Sep. 4, 2020.

(51) Int. Cl.
*G01N 1/36* (2006.01)
*G01N 1/30* (2006.01)

(52) U.S. Cl.
CPC .............. *G01N 1/36* (2013.01); *G01N 1/30* (2013.01); *G01N 2001/366* (2013.01)

(58) Field of Classification Search
CPC ....... G01N 1/36; G01N 1/30; G01N 2001/366
See application file for complete search history.

(56) References Cited

U.S. PATENT DOCUMENTS

| | | | | |
|---|---|---|---|---|
| 2022/0326251 A1* | 10/2022 | Uytingco | ................. | G01N 1/30 |
| 2023/0242976 A1* | 8/2023 | Tentori | ................... | B01L 3/545 |
| | | | | 435/6.1 |

OTHER PUBLICATIONS

Sigma Aldrich, TPP tissue culture plates, https://www.sigmaaldrich.com/us/en/product/sigma/z707783 (Year: 2024).*
Fisher Scientific, Falcon Tissue Culture Dishes, https://www.fishersci.com/shop/products/falcon-easy-grip-tissue-culture-dishes-2/p-88171?keyword=353004#tab1 (Year: 2024).*
Extruded Polystyrene Foam Association, Polystyrene vs. Styrene, https://xpsa.com/technical-information/polystyrene-vs-styrene/ (Year: 2024).*
Farrell, R. Chapter 7—Resilient Ribonucleases, RNA Methodologies (Fourth Edition), 2010, pp. 155-172, ISBN 9780123747273, https://doi.org/10.1016/B978-0-12-374727-3.00007-3 (Year: 2010).*
Asano, S. et al. Expansion microscopy: Protocols for imaging proteins and RNA in cells and tissues, 2018, Current Protocols in Cell Biology, 80, e56: 1-41 (Year: 2018).*
Jaeger, P. et al. Beyond Agar: Gel Substrates with Improved Optical Clarity and Drug Efficiency and Reduced Autofluorescence for Microbial Growth Experiments, 2015, Applied and Environmental Microbiology, 81(16): 5639-5649 (Year: 2015).*
Norman et al., "Optimized Expansion Microscopy of Chromatin", ASCB, Abstract, Nov. 30, 2019.
Norman et al., "Optimized Expansion Micrscopy of Chromatin,", Poster, ASCB, Dec. 10, 2019.
Truckenbrodt et al. Nat. Protocols, 2019.
Winey and O'Toole Phil. Trans. R. Soc. B, 2014.

* cited by examiner

*Primary Examiner* — Blaine Lankford
(74) *Attorney, Agent, or Firm* — Quarles & Brady LLP (57) ABSTRACT

Conventional expanded microscopy (ExM) is improved upon to show reliable and reproducible 4-fold and 12-fold modified expansion microscopy (mExM). Kits and methods are disclosed to achieve these improvements. The kits can include a sealable mold and instructions for using it in the improved methods. The kits can include a protein digestion buffer including sodium dodecyl sulfate and instructions for using the buffer in the improved methods. The improved methods can include a simplified approach to executing oxygen-sensitive reactions within the methods. The improved methods can include improved protein digestion chemistries, which can facilitate the improvements in reliability and reproducibility.

7 Claims, 3 Drawing Sheets

KITS AND METHODS FOR SUPER-RESOLUTION MICROSCOPY

CROSS-REFERENCE TO RELATED APPLICATIONS

This application is related to, claims priority to, and incorporates herein by reference for all purposes U.S. Provisional Patent Application No. 63/074,645, filed Sep. 4, 2020.

STATEMENT REGARDING FEDERALLY FUNDED RESEARCH

This invention was made with government support under CA234904 and GM141068 awarded by the National Institutes of Health. The government has certain rights in the invention.

BACKGROUND

Light microscopy is one of the powerful tools to study protein dynamics and protein functions in both fixed and living cells. The diffraction limit (optical resolution limit) in light microscopy is ~250 nm in x, y-axis, and ~600 nm in z-axis without any mathematical image processing. Since many of cellular system and protein architectures in cells have less than diffraction limited size, it is a big challenge to study those functions using light microscopy. To overcome this technical difficulty, researchers mainly use two approaches; one is to use electron microscopy, and another is to use super-resolution light microscopy. Advantage of the use of electron microscopy can achieve ~1 nm resolution without any image processing, but it has multiple disadvantages; one is technical difficulty to prepare samples, second is that it works with only fixed samples, and the last is difficulties in labeling a target protein, especially with multiple targets. Because of those reasons, developing super-resolution light microscopy is highly demanded. Recent technology allows to reach 50~150 nm resolution using super-resolution microscopes, but it requires mathematical image processing, very high signal to noise ratio images, to use with specific dyes, and the use of very expensive equipment, that make existing methods difficult to use in broad research fields and researchers. Additionally, almost all super-resolution microscopy uses mathematical image processing to obtain better resolution, it is always needed to consider whether the image processed by super-resolution microscopy is real or not. There is a big research filed to develop new instrument to achieve better resolution, but recent studies proposed an alternative solution, which makes samples larger rather than developing new expensive microscopes to reach better resolution. This alternative solution is called expansion microscopy. Expansion microscopy allows expansion of specimens (cells, human organoids, tissues, etc) with regular staining (multiple colors) and is able to image with any light microscopes (or super-resolution microscopes). The original protocol of expansion microscopy called ×4 expansion microscopy was disclosed, but reproduction in our lab and other reports did not achieve the purported expansion and expansions of ×2.5 were achieved instead. Additionally, these methods required use of expensive equipment and also have issues in 3D imaging. A newer protocol of expansion microscopy emerged called ×10 expansion, but again, reproduction in our lab was not achievable and expansions of ×5.5 were achieved by the disclosed methods.

A need exists for improved techniques that actually achieve reproducible 4-fold and larger expansion, while simplifying the method steps and/or the equipment needed to achieve the performance results.

SUMMARY

Below we summarize our novel 4-fold and a 12-fold mExM (modified expansion microscopy) methodologies, which stably and reproducibly expand specimen with 4-fold and 12-fold. Our new mExM methods can achieve ~5 nm accuracy with super-resolution microscopes and ~20 nm accuracy with regular wide-field microscopes.

In one aspect, the present disclosure provide a kit for mExM. The kit includes a chemically and biochemically inert mold and instructions for us of the chemically and biochemically inert mold in an mExM method. The mold is dimensioned to receive a cell of interest with sufficient volume to undergo at least a 12-fold increase in cell volume of the cell of interest. The instructions include a description an expanded microscopy (ExM) method that includes at least one method step that involves polymerization in the absence of oxygen. The instructions also include a written or visual representation of execution of the exM method by conducting the at least one method step that involves polymerization in the mold by forming a hand-made seal with a manual sealing material and excluding visible oxygen bubbles form the mold upon sealing. The kit can optionally include a protein digestion buffer including sodium dodecyl sulfate and a buffering component.

In another aspect, the present disclosure provides a kit for mExM. The kit includes a protein digestion buffer and instructions for use of the protein digestion buffer in an mExM method. The protein digestion buffer includes sodium dodecyl sulfate and a buffering component. The instructions include a description of an ExM method that includes at least one method step that involves a digestion step utilizing a protein digestion agent. The instructions also include a written or visual representation of execution of the ExM method by utilizing the protein digestion buffer in the digestion step. The written or visual representation includes reaction conditions for the digestion step.

In yet another aspect, the present disclosure provides a kit for mExM. The kit includes a protein digestion buffer and a chemically and biochemically inert mold. The protein digestion buffer includes sodium dodecyl sulfate and a buffering component. The protein digestion buffer is present in concentrations suitable for direct addition to the mold to effect a digestion step of the mExM.

In a further aspect, the present disclosure provides a method of mExM. The method includes: a) fixating a cell of interest to an inert surface, the inert surface located within a chemically and biochemically inert mold or the inert surface and the chemically and biochemically inert mold adapted such that the inert surface is receivable within the chemically and biochemically inert mold; b) crosslinking portions of cellular components of the cell of interest; c) infusing the cell of interest with a plurality of ExM monomers and polymerizing at least a portion of the ExM monomers, wherein the polymerized ExM monomers do not properly gel in the presence of oxygen; d) optionally introducing the inert surface into the chemically and biochemically inert mold; e) introducing a gelling solution into the chemically and biochemically inert mold including the inert surface and the cell of interest; f) subsequent to step e), providing an air-tight seal to the chemically and biochemically inert mold, the air-tight seal excluding air bubbles from the chemically and biochemically inert mold, the air-tight seal capable of being formed with manual force; g) gelling the polymerized ExM monomers, the gelling proceeding without active deoxygenation; h) digesting proteins within the cell of interest by adding a digestion composition to the cell of interest; i) expanding the cell of interest by initiating expansion of the gelled, polymerized ExM monomers; and j) preparing the expanded cell of interest for imaging.

In yet another aspect, the present disclosure provides a method of mExM. The method includes: a) fixating a cell of interest to an inert surface, the inert surface located within a chemically and biochemically inert mold or the inert surface and the chemically and biochemically inert mold adapted such that the inert surface is receivable within the chemically and biochemically inert mold; b) crosslinking portions of cellular components of the cell of interest, the crosslinking comprising a crosslinking agent comprising acryloyl-X, glutaraldehyde, or a combination thereof; c) infusing the cell of interest with a plurality of expansion microscopy (ExM) monomers and polymerizing at least a portion of the ExM monomers; d) optionally introducing the inert surface into the chemically and biochemically inert mold; e) introducing a gelling solution into the chemically and biochemically inert mold including the inert surface and the cell of interest; f) optionally providing an air-tight seal to the chemically and biochemically inert mold, the air-tight seal excluding air bubbles from the chemically and biochemically inert mold, the air-tight seal capable of being formed with manual force; g) gelling the plurality of polymerized ExM monomers; h) digesting proteins within the cell of interest, the digesting including use of a protein digestion agent and a protein digestion buffer, the protein digestion buffer including sodium dodecyl sulfate and a buffering component; i) expanding the cell of interest by initiating expansion of the gelled, polymerized ExM monomers; and j) preparing the expanded cell of interest for imaging.

DETAILED DESCRIPTION

Before the present invention is described in further detail, it is to be understood that the invention is not limited to the particular embodiments described. It is also understood that the terminology used herein is for the purpose of describing particular embodiments only, and is not intended to be limiting. The scope of the present invention will be limited only by the claims. As used herein, the singular forms "a", "an", and "the" include plural embodiments unless the context clearly dictates otherwise.

Specific structures, devices and methods relating to modifying biological molecules are disclosed. It should be apparent to those skilled in the art that many additional modifications beside those already described are possible without departing from the inventive concepts. In interpreting this disclosure, all terms should be interpreted in the broadest possible manner consistent with the context. Variations of the term "comprising" should be interpreted as referring to elements, components, or steps in a non-exclusive manner, so the referenced elements, components, or steps may be combined with other elements, components, or steps that are not expressly referenced. Embodiments referenced as "comprising" certain elements are also contemplated as "consisting essentially of" and "consisting of" those elements. When two or more ranges for a particular value are recited, this disclosure contemplates all combinations of the upper and lower bounds of those ranges that are not explicitly recited. For example, recitation of a value of between 1 and 10 or between 2 and 9 also contemplates a value of between 1 and 9 or between 2 and 10.

Kits and methods for improved cellular microscopy are disclosed. Specifically, improvements to expanded microscopy techniques are disclosed.

Before describing specific kits in detail, it should be appreciated that the individual kits that are described can include components or features of the other described kits. One such combined kit includes all of the components and all of the instructions described in all of the kits. Each of the separately-described kits articulates a feature that achieves a particularly impressive results or that provides a particularly impressive simplification of existing techniques.

A first kit is disclosed that includes a chemically and biochemically inert mold and instructions for use of the mold. The chemically and biochemically inert mold is dimensioned to receive a cell of interest (e.g., tissue culture cells, human organoids, tissue samples including multiple cells, and the like) with sufficient volume to undergo at least a 12-times increase in cell volume of the cell of interest. The instructions include a description of an expanded microscopy (ExM) method and a written or visual representation of execution of the ExM method. The ExM method includes at least one method step that involves polymerization in the absence of oxygen. The written or visual representation includes execution of the ExM method by conducting the at least one method step that involves polymerization in the chemically and biochemically inert mold by forming a hand-made seal with a manual sealing material and excluding visible oxygen bubbles (and avoid contacting air) from the chemically and biochemically inert mold upon sealing. Under existing methods, active deoxygenation has been traditionally required, so this simplification of this process saves significant cost and effort.

A second kit is disclosed that includes a protein digestion buffer and instructions for use of the protein digestion buffer in an ExM method. The instructions include a description of an ExM method that includes at least one method step that involves a digestion step utilizing a protein digestion agent. The instructions further include a written or visual representation of execution of the ExM method by utilizing the protein digestion buffer in the digestion step. The written or visual representation including reaction conditions for the digestion step.

A third kit is disclosed that includes the protein digestion buffer and the chemically and biochemically inert mold. The protein digestion buffer includes sodium dodecyl sulfate. The protein digestion agent is present in concentrations suitable for direct addition to the chemically and biochemically inert mold to effect a digestion step of an ExM method. The third kit can optionally include, but does not require, instructions.

The instructions for any of the first, second, or third kit can include any of the method steps, reaction conditions, or other details described below with respect to method 100, method 200, or the examples.

Figure 1:
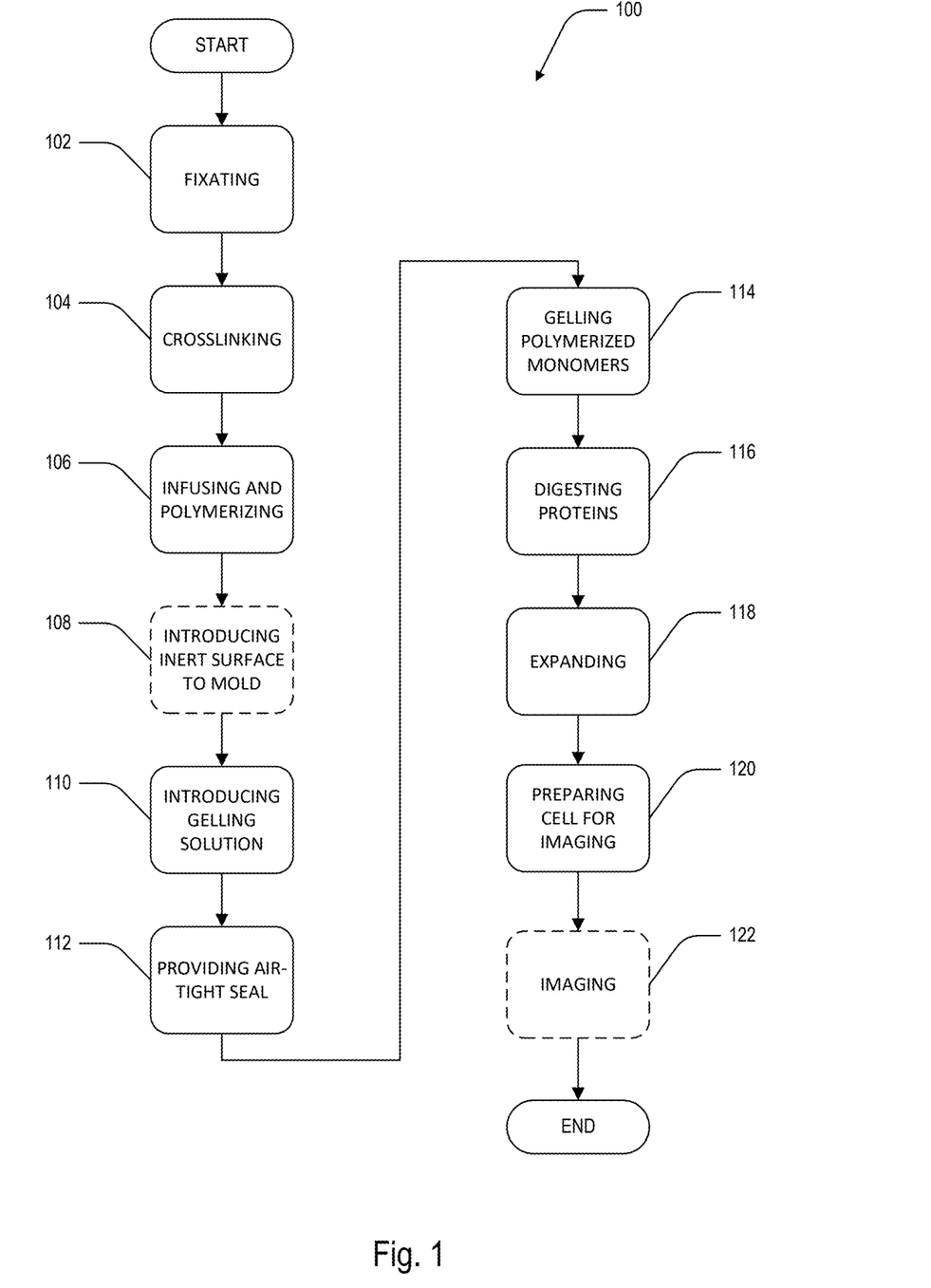
FIG. 1 is a flowchart illustrating a method, in accordance with an aspect of the present disclosure.

Referring to FIG. 1, a method 100 of ExM is disclosed. At process block 102, the method 100 includes fixating a cell of interest to an inert surface. In some cases, the inert surface can be positioned within a chemically and biochemically inert mold. In other cases, the inert surface can be outside of the mold and adapted to be receivable within the mold. At process block 104, the method 100 includes crosslinking portions of cellular components of the cell of interest. At process block 106, the method 100 includes infusing the cell of interest with a plurality of ExM monomers and polymerizing at least a portion of the ExM monomers. As discussed elsewhere herein and specifically relevant to method 100, some polymerized ExM monomers do not properly gel in the presence of oxygen (i.e., those used to achieve a 12-fold expansion-monomers used for the 4-fold expansion can polymerize in the presence of oxygen). At optional process block 108, the method 100 optionally includes introducing the inert surface into the mold. Optional process block 108 is utilized in cases where the inert surface is positioned outside of the mold. At process block 110, the method 100 includes introducing a gelling solution into the chemically and biochemically inert mold including the inert surface and the cell of interest. At process block 112, the method 100 includes, subsequent to process block 110, providing an air-tight seal to the chemically and biochemically inert mold. The air-tight seal excludes air bubbles from the mold and avoids allowing air to contact the contents of the mold. The air-tight seal is capable of being formed with manual force. At process block 114, the method 100 includes gelling the polymerized ExM monomers. The gelling proceeds without active deoxygenation. At process block 116, the method 100 includes digesting proteins within the cell of interest. At process block 118, the method 100 includes expanding the cell of interest by initiating expansion of the gelled, polymerized ExM monomers. At process block 120, the method 100 includes preparing the expanded cell of interest for imaging. At optional process block 122, the method 100 optionally includes imaging the prepared, expanded cell of interest.

Figure 2:
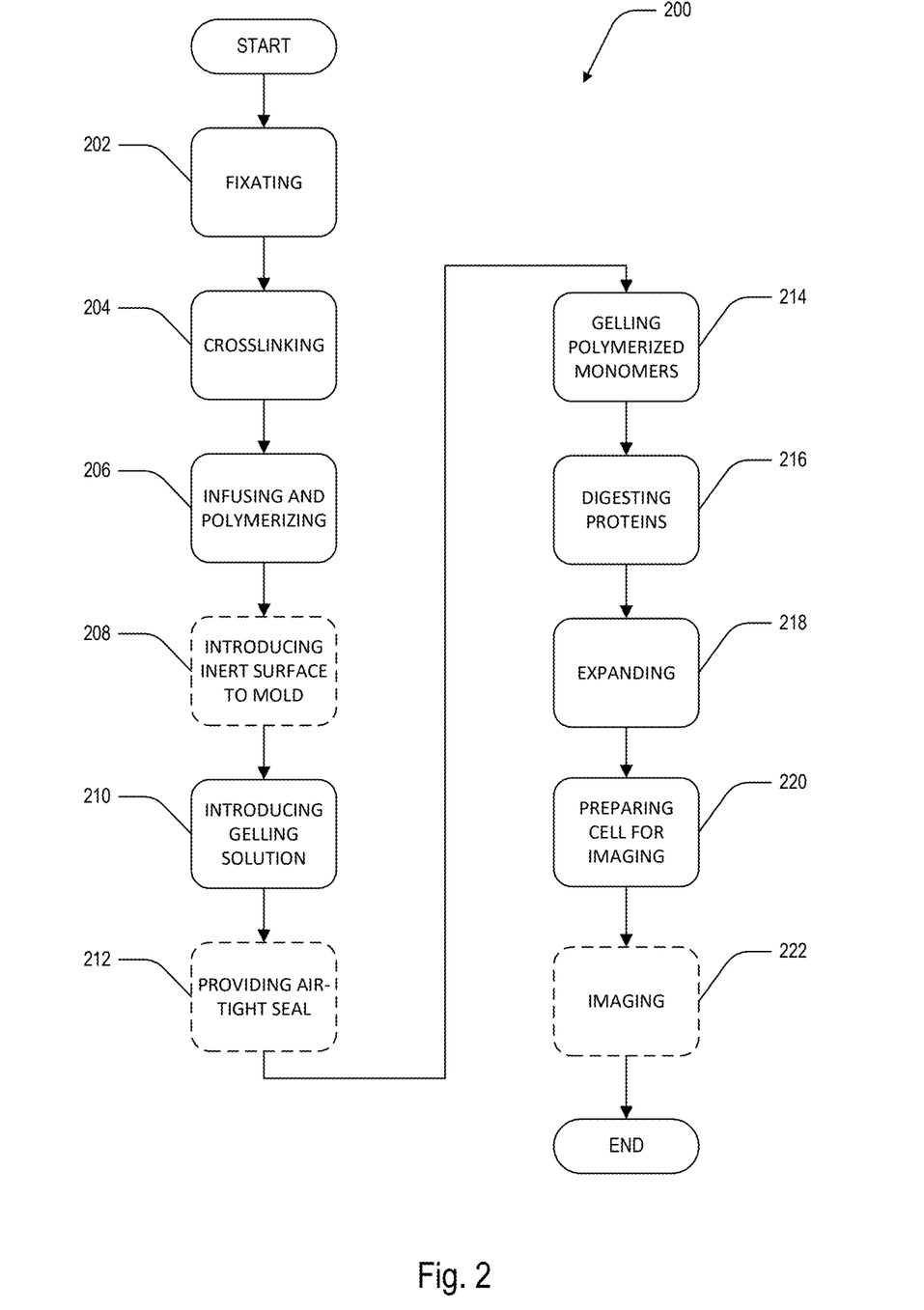
FIG. 2 is a flowchart illustrating a method, in accordance with an aspect of the present disclosure.

Referring to FIG. 2, a method 200 of ExM is disclosed. At process block 202, the method 200 includes fixating a cell of interest to an inert surface. In some cases, the inert surface can be positioned within a chemically and biochemically inert mold. In other cases, the inert surface can be outside of the mold and adapted to be receivable within the mold. At process block 204, the method 200 includes crosslinking portions of cellular components of the cell of interest. The crosslinking comprises a crosslinking agent comprising acryloyl-X, glutaraldehyde, or a combination thereof. At process block 206, the method 200 includes infusing the cell of interest with a plurality of ExM monomers and polymerizing at least a portion of the ExM monomers. At optional process block 208, the method 200 optionally includes introducing the inert surface into the mold. Optional process block 208 is utilized in cases where the inert surface is positioned outside of the mold. At process block 210, the method 200 includes introducing a gelling solution into the chemically and biochemically inert mold including the inert surface and the cell of interest. At optional process block 212, the method 200 optionally includes providing an air-tight seal to the chemically and biochemically inert mold. The air-tight seal excludes air bubbles from the mold. The air-tight seal excludes air bubbles from the mold. The air-tight seal is capable of being formed with manual force. At process block 214, the method 200 includes gelling the polymerized ExM monomers. The gelling optionally proceeds without active deoxygenation. At process block 216, the method 200 includes digesting proteins within the cell of interest. The digesting comprises use of a protein digestion composition including a protein digestion agent and a protein digestion buffer. The protein digestion buffer includes sodium dodecyl sulfate. At process block 218, the method 200 includes expanding the cell of interest by expansion of the gelled, polymerized ExM monomers. At process block 220, the method 200 includes preparing the expanded cell of interest for imaging. At optional process block 222, the method 200 optionally includes imaging the prepared, expanded cell of interest.

The first kit and the method 100 expressly require the use of the chemically and biochemically inert mold and the second kit, the third kit, and the method 200 optionally include it. For the avoidance of doubt, all features described herein with respect to the chemically and biochemically inert mold are contemplated for use with the first, second, and third kit and the methods 100, 200 described herein.

In some cases, the chemically and biochemically inert mold can have a substantially cylindrical interior shape. The chemically and biochemically inert mold can be formed of a material selected from the group consisting of silicone, gum, or other materials that can provide an air- and water-tight seal when properly sealed as described herein, including hydrophobic materials, and combinations thereof. The materials are not necessarily rigid materials. As long as the mold maintains gelling solution on the specimens (with coverslip) and can seal to avoid contacting air (if the case a 12-fold gel), the mold can be suitable for the present disclosure. The chemically and biochemically inert mold can have an opening that is adapted to be sealable with a temporary covering material with an air-tight seal.

The methods 100, 200 involve use of an inert surface and the first, second, and third kit can optionally include it.

In some cases, the inert surface is positioned in the bottom of the chemically and biochemically inert mold in a permanent or semi-permanent fashion.

In some cases, the inert surface is adapted to be removed from and introduce to the chemically and biochemically inert mold. In some cases, the inert surface has a shape that is a cross-sectional shape of the mold. In some cases, particularly when the mold has a cylindrical shape, the inert surface is circular.

The inert surface can be glass. In some cases, the inert surface is a glass cover slip. In some cases, the glass cover slip is cut to a shape that is adapted for introduction into the mold.

The fixating of process blocks 102 and 202 can be standard cellular fixating understood by those having ordinary skill in arts that involve the imaging of cells. In some cases, the fixating involve sub-steps including a cell preparation sub-step, a primary fixation sub-step, and a pre-ExM staining sub-step. The cell preparation sub-step can involve spreading a cell or interest or multiple cells of interest on the inert surface and growing the cell(s) of interest for at least 36 hours or at least 48 hours. The primary fixation sub-step can involve fixing the cells by introducing pre-warmed 3% PFA in PHEM buffer for 15 minutes at 37° C. Other fixation approaches (Glutaraldehyde, methanol, acetone, and others) can be utilized, as will be appreciated by those having ordinary skill in the art. The inventors surprisingly discovered that using PFA in a phosphate buffered saline buffer system, or fixations with methanol or acetone showed less preservation effects compared to the use with PHEM or Hepes based buffer. Thus, in some cases, it can be preferable to exclude phosphate-buffered saline buffers and/or their components from the fixating step of methods 100, 200. The pre-ExM staining sub-step can involve a conventional immunostaining protocol, as would be understood by those having ordinary skill in the art. Conventional immunostaining can be achieved with Alexa Fluor™ 488, Alexa Fluor™ 568, Rhodamine Red-X, or other conventional dyes known to those in the art.

One non-limiting example of a pre-ExM staining sub-step process includes: 1) after cells are fixed, cells can be washed by a buffer, such as PHEM or PBS, one, two, or three times-if high concentrations of PFA or glutaraldehyde are utilized, a quenching step can be performed here with glycine or sodium borohydride containing PHEM or PBS; 2) blocking by bovine serum albumin (BSA), skim milk, or immunoglobulin G (IgG) for 15-30 minutes at room temperature; 3) incubation with primary antibodies in blocking buffer at 37° C. for 1 hour or 4° C. overnight; 4) washing cells with blocking buffer at least three times; 5) incubating with secondary antibodies in blocking buffer at 37° C. for 1 hour or 4° C. overnight; 6) washing cells with a buffer, such as PHEM or PBS; 7) DNA staining by a DNA dye, such as DAPI.

The crosslinking of process blocks 104 and 204 can be achieved with a crosslinking agent. The first, second, and third kit can also include the crosslinking agent. The crosslinking agent can include acryloyl-X (AcX), glutaraldehyde (GA), or a combination thereof.

In some cases, AcX is used without GA. Conventional ExM methods utilized AcX in higher concentrations than the present methods. Inventors surprisingly discovered that lower concentrations of AcX produced more reliable results than the higher concentrations used in conventional ExM methods (in fact, without wishing to be bound by any particular theory, the inventors believe that the higher concentration of AcX used in conventional ExM methods limit expansion). In conventional methods, the final concentration of AcX in the crosslinking step is ~0.1 mg/ml. In methods 100 and 200, where AcX is used without GA, the final concentration of AcX in this step can be between 0.001 and 0.05 mg/ml or between 0.01 and 0.05 mg/ml. The AcX can be provided in a buffer solution, such as a PBS buffer.

In some cases, GA is used without AcX. In such cases, the GA is used at a final concentration of between 0.1% and 2% by weight in a buffer solution, such as a PBS buffer.

In some cases, AcX and GA are used together in the concentrations described above.

For each of the crosslinking agents utilized, the crosslinking of process blocks 104 and 204 can involve incubation at room temperature with protection from light. The incubation can be for a length of time of between 15 min and 24 hours.

In some cases, the methods 100, 200 can include a washing step following the crosslinking of process blocks 104 and 204. This washing can be by a buffer, such as a PBS buffer, and can be repeated two, three or more times.

If the crosslinking agent includes GA, the methods 100, 200 can include an optional additional crosslinking by a 0.01-2% by weight GA in a buffer solution. The additional crosslinking can be done for between 5 minutes and 30 minutes or between 10 and 20 minutes at room temperature.

The gelling solution of methods 100, 200 of any of its components can be included in the first, second, or third kit.

The gelling solution includes ExM monomers. The degree of expansion is strongly linked to the ExM monomer that is chosen. For cases where ~×4 expansion is desired, the ExM monomers can include acrylamide, N,N'-methylenebisacrylamide, or a combination thereof. For cases where 10$x$ expansion is desired, the ExM monomers can include N,N'-dimethylacrylamide (DMAA).

For 4-fold gels, three buffers can be used together. (1) 1×PBS, 2M NaCl, 2.5% w/v Acrylamide, 0.15% w/v N,N'-methylenebisacrylamide, 8.6% Sodium Acylate, (2) 10% Ammonium Persulfate, and (3) 10% w/v TEMED. All three solutions can be stored at −20° C. for few months. For gel polymerization, 95% of solution (1), 0.2% of both solution (2) and (3), and 0.1% of water are mixed. For 12-fold gels, following two buffers can be used together. (1) the molar ratio of DMAA (N,N'-dimethylacrylamide) to sodium acrylate is 4:1. For example, we typically make DMAA 1.335 g, Sodium, acrylate 0.32 g, and water 2.85 g in which total volume becomes ~4.5 ml. The solution can be stored at −20° C. for up to three weeks but no longer recommended. (2) 3.6% of KPS solution (in water). For gel polymerization, 10% of solution (1), 10% of solution (2), and ~0.4% of TEMED are mixed.

The introducing of the gelling solution of process block 110 and 210 can involve optionally washing the cell(s) of interest prior to actually introducing the gelling solution. In some cases, the introducing of process blocks 110 and 210 can include adding a buffer solution that does not include the ExM monomers to the mold and subsequently adding the ExM monomers (in most cases, in a buffer themselves).

Some conventional ExM methods that utilize DMAA require active deoxygenation. The inventors surprisingly discovered an elegant and inexpensive alternative to active deoxygenation. This alternative is the providing an air-tight seal and excluding air bubbles of process blocks 112 or 212.

The air-tight seal can be formed by a wax material, a film, a nylon material, a silicone, a flexible hydrophobic material, or a combination thereof.

Gelling the polymerized ExM monomers of process blocks 114 and 214 can be achieved without active deoxygenation. Gelling the polymerized ExM monomers of process blocks 114 and 214 can involve incubation at room temperature plus or minus 5° C. for a length of time of between 1 hour and 6 hours, between 1.5 hours and 3 hours, or between 2 hours and 2.5 hours.

In one specific case, the providing an air-tight seal and excluding air bubbles involves contacting the opening of the mold with a paraffin wax film, squeezing any excess air out of the mold, and then finally sealing the opening of the mold with the film.

The digesting of process blocks 116 and 216 can use a protein digestion composition. The protein digestion composition includes a protein digestion agent and a protein digestion buffer. The first, second, and third kit can include the protein digestion agent. The first, second, and third kit can include the protein digestion buffer.

The protein digestion agent can be a serin protease, such as Proteinase K, or a protein digestion enzyme understood by those having ordinary skill in the art to have digestion capabilities that are necessary for allowing the methods described herein to achieve their full expansions.

The protein digestion buffer includes sodium dodecyl sulfate (SDS) and a buffering component. The buffering component can include standard buffers known to those having ordinary skill in the art, such as TAE buffer (Tris, acetic acid, and EDTA). The protein digestion buffer can include SDS in an amount such that a final concentration in the protein digestion buffer is between 0.1% and 1%, including between 0.25% and 0.75%, or between 0.4% and 0.6%, where these percentages can be weight by volume or weight by weight. The protein digestion buffer is stable when stored at −20° C. for at least three months. In some cases, the protein digestion buffer includes 1×TAE (40 mM Trix, 20 mM acetic acid, 1 mM EDTA), 0.5% v/v of Triton-X, 0.1-1% of SDS, and 8~70 U of Proteinase K.

The protein digestion agent can be present in the protein digestion composition in an amount of between 8 units per sample and 100 units per sample.

Conventional digesting steps in previous expanded microscopy methods have required incubation at elevated temperatures, such as 45-65° C. The inventors surprisingly discovered that the methods and compositions described herein can achieve the necessary digestion and corresponding expansion by incubating at between 35° C. and 40° C., including 37° C., for between 15 min and 48 hours, including between 18 hours and 36 hours or between 21 hours and 30 hours.

The expanding of process blocks 118 and 218 can involve initiating expansion of the ExM monomers using an activation mechanism associated with the ExM monomers. In some cases, the expanding involves incubating the gel at room temperature in pure water for between 1 hours and 12 hours, periodically replacing the water with fresh pure water. In some cases, particularly for ×4 ExM, the expanding is done for 2 hours, exchanging the water for fresh pure water every 30 minutes. For a 4-fold gel, PBS or other physiological buffer can be used instead of water, but for a 12-fold gel, the buffer containing phosphate such as PBS causes shrinkages. Note, those buffer containing phosphate can be used to re-shrinkage for a 12-fold ExM. It can shrink to the pre-expansion size by PBS wash, then can be re-expanded again by water wash. In some cases, particularly for ×12 ExM, the expanding is done for 8 hours, exchanging the water for fresh pure water every 2 hours.

In some cases, the expanding involves water sufficient to cover the entire gel. In some cases, the expanding involves only partially submerging the gel in the pure water.

In some cases, the gels are removed from the molds prior to expanding. In some cases, the gels are shielded from light during the expanding.

The preparing the expanded cell of interest for imaging of process blocks 120 and 220 can involve conventional approaches to preparing a three-dimensional sample for imaging.

In some cases, the preparing of process block 120 and 220 includes post-staining.

In some cases, the preparing of process block 120 and 220 includes removing the expanded gel from water, and mounting the expanded gel within a mounting medium comprising between 20 and 100% glycerol. The mounting medium can further include an anti-fade reagent to suppress photobleaching. The anti-fade reagent can include n-propyl gallate, dimethyl sulfoxide, tris(hydroxymethyl)aminomethane, other anti-fade reagents known to those having ordinary skill in the art, or combinations thereof.

In some cases, preparing of process blocks 120 and 220 can include applying pressure and/or compressing the expanded cell of interest to reduce its size in a dimension along which the imaging is intended to proceed. In other words, the cell of interest is compressed in the dimension along the optical axis of the imaging modality. Preparing can also include introducing the expanded gel into a second mold that is dimensioned to stably maintain the gel's position during imaging.

The imaging of process blocks 122 and 222 can include conventional microscopy techniques, though more complicated techniques are contemplated for use with the present disclosure. One of the unexpected results of the present disclosure is achieving reliable expansion of cells, such that conventional microscopy systems can be utilized to observe features that are typically below the diffraction limit of such systems.

Example 1. ×4 Expansion

Figure 3:
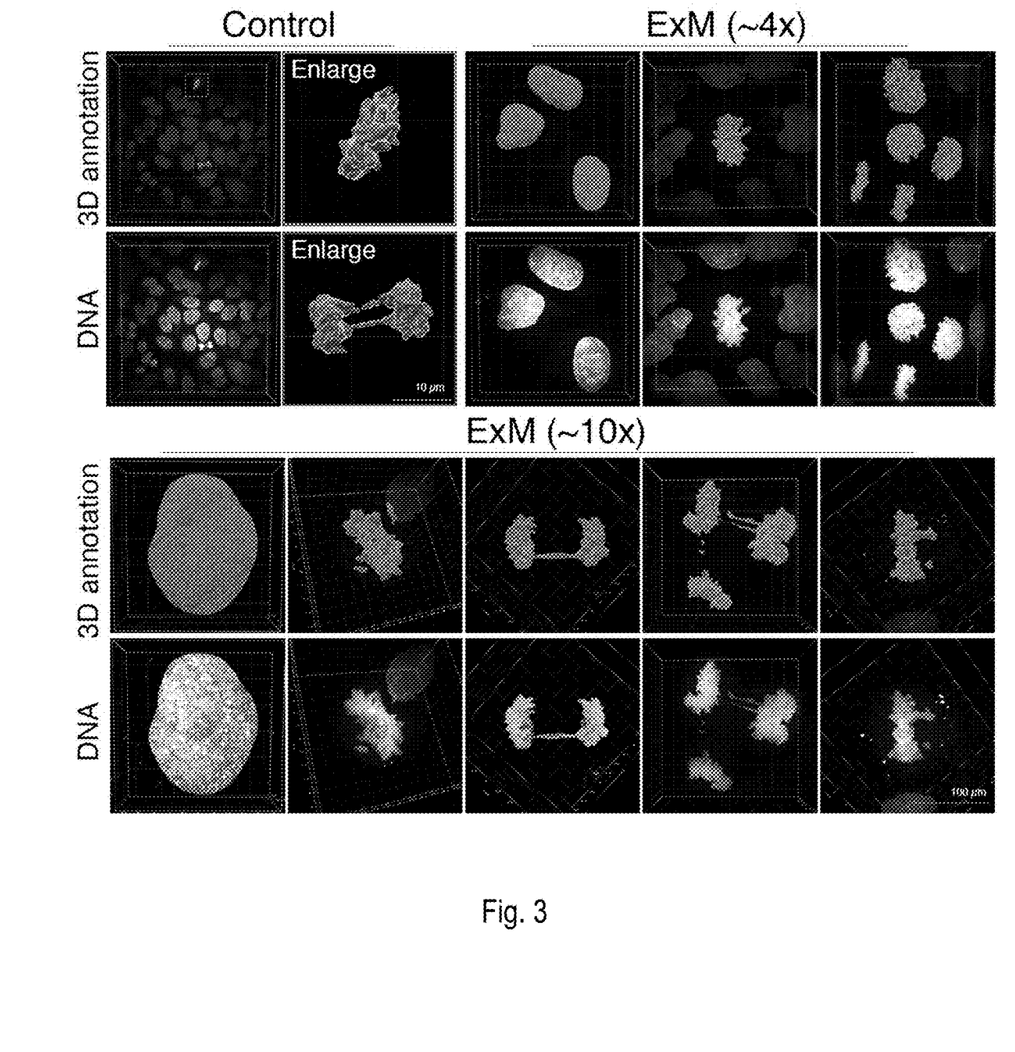
FIG. 3 is a series of acquired images from Example 1 and Example 2.

The following text describes the protocol that was followed for Example 1. The results of Example 1 are shown in FIG. 3, where they are compared against a control.

1. Cell Preparation

Spread any cells or organoids you would like to do expansion on 12 mm circular coverslips (#1.5 thickness) and grow cells at least two over nights. Avoid confluent when you fix cells in next step. Note that you can use different size or shape of coverslips, but 12 mm circular coverslips fits for current silicone molds we have.

2. Primary Fixation

Fixation can be done by regular methods including PFA, MeOH, Aceton, and GA. Here, we show one of our PFA methods as an example. After two over, fix cells by prewarmed (37° C.) 3% PFA in PHEM buffer for 15 min at 37° C. PBS can be also used but PHEM buffer preserves cellular architecture better than PBS. Some fixation, such as MeOH, causes shrinkages. However, any fixations can be used for mExM.

3. Pre-ExM Staining

Regular immunostaining (IF) protocol can be performed. Here is summary of one of typical methods. Note that post-ExM staining, staining after expansion, is also available.

3-1. After cells are fixed, cells are washed by PHEM or PBS for three times. If you use high concentration of PFA or GA (glutraldehyde), quenching step by Glycine or Sodium borohydrate, is required here.

3-2. Blocking by BSA, skim milk, or IgG in PBS or PHEM for 15~30 min at room temperature.

3-3. Incubation with primary antibodies in blocking buffer at 37° C. for at least 1 hour or 4° C. for overnight if needs. Multi-color staining allows using multiple primary antibodies.

3-4. Wash cells by blocking buffer for at least three times.

3-5. Incubation with secondary antibodies in blocking buffer at 37° C. for at least 1 hour or 4° C. for overnight if needs. Note that majority of regular dyes, such as Alexa488, Alexa 568, Cy3, and Rhodamine Red-X, can be used.

3-6. Wash cells by PHEM or PBS 3-7. DNA staining by DAPI or other dye if necessary.

Note that if your cells expressing fluorescent proteins such as EGFP, you can skip IF or you can do IF using EGFP antibodies to enhance signals. Our mExM can detect native EGFP or other fluorescence proteins without IF.

If your cells expressing tags can be stain later such SNAP tag or Halo tags. Staining dyes for those tags can be added before next step (pre-expansion) or after expansion (post-expansion).

4. Crosslink

Coverslips are transferred into 24 well dishes. Following three methods can be used (choose 1)

(a) AcX method: Add all into one coverslip in 24 well dishes and Incubate cells with Acryloyl-X, SE (AcX), (f.c. 0.01~0.05 mg/ml) on shakers for overnight (13~18 hrs) at room temperature with protection from light (wrapped by foil). Acryloyl-X 10 mg/mL stock solution can be stored in aliquots of 5 µL at −20° C. for a few months if freeze-thaw cycle is avoided. Stock solution is composed of 500 µL of anhydrous DMSO and 5 mg of Acryloyl-X, SE.

(b) GA Method: Glutaraldehyde f.c. (final concentration) 0.1~2% of GA in 1× PBS/PHEM. Incubation time is same as above AcX, but we typically replace fresh GA (same concentration) in next day and incubate just 15 min at room temperature.

(c) AcX-GA Method: 0.1~2% of GA and 0.01~0.05 mg/ml of AcX in 1× PBS/PHEM. Incubation time is same as above AcX, but we typically replace fresh GA (same concentration) in next day and incubate just 15 min at room temperature.

5. Wash

Cells are washed by PBS for at least three times.

6. Additional Crosslink

Cells are incubated with fresh 0.25% of GA (glutaraldehyde) in PBS for 15 min at room temperature. Recommended to use EM (electron microscopy) grade of GA.

7. Gelling

Three following buffers are used for gelling of ~×4 ExM.

Buffer 1: x4 ExM Monomer Solution, aliquots of 1 mL, store −20° C. for few months

| Chemicals | Final Concentration |
|---|---|
| 10× PBS | 1× |
| 5M NaCl | 2M |
| Acrylamide | 2.5% w/v |
| N,N'-Mathylenebisacrylamide | 0.15% w/v |
| Sodium Acrylate | 8.6% w/v |
| Double-distilled Water (milli Q water) | Up to 20 mL |
| Total | 20 mL |

Buffer 2: APS, aliquots of 500 µL, store −20° C. for few months

| Chemicals | Amount |
|---|---|
| Ammonium Persulfate | 0.1 g |
| Double-distilled water (milli Q water) | 1 mL |

Buffer 3: TEMED 10% w/v, aliquots of 20 µL, store −20° C. for few months

| Chemicals | Amount |
|---|---|
| TEMED | 100 µL |
| Double-distilled water (milli Q water) | 900 µL |

7-1: Prepare ice bucket (with ice), attach silicone molds to glass-slides, and a humid box (pre-warmed couple of hours prior to next step).

7-2: Infusion: washout with 1×PBS few times, then add 200 µl of ×4 ExM monomer solution (buffer 1 above) and incubate for 30 min at 4° C.

7-3: Polymerization: coverslips are placed in the whole of silicone molds and make gel solution (see below) and add 70 µl of gel solution to each sample, then incubate them in a humid box (pre-warmed and keep humidity) at 37° C. for 1 hr.

Silicone molds can be re-used multiple times (>10 times), but require washing out. If the mold has tears, then it must be discarded and cannot be re-used.

4× ExM Gel Solution

| Chemicals | Amounts |
|---|---|
| Buffer 1 | 475 µL |
| Double-distilled water (milli Q water) | 5 µL |
| Buffer 2 | 10 µL |
| Buffer 3 | 10 µL |

8. Digestion

Buffer 4a: Digestion Buffer sans ProK, aliquots of 5~6 L, store −20° C. for few months

| Chemicals | Amounts |
|---|---|
| Triton X-100 | 1 mL |
| 50× TAE | 4 mL |
| Guanidine HCl | 15.29 g |
| Double-distilled water (milli Q water) | Adjust to 200 mL |

Buffer 4b: Digestion Buffer sans ProK, aliquots of 5~6 µL, store −20° C. for few months

| Chemicals | Amounts |
|---|---|
| Triton X-100 | 1 mL |
| 50× TAE | 4 mL |
| Guanidine HCl | 15.29 g |
| Double-distilled water (milli Q water) | Adjust to 200 mL |

8-1: Thaw Buffer 4a or 4b to become room temperature.
8-2: Prepare Digestion Buffer (Buffer 5).

Buffer 5: Digestion Buffer (make before using every time-vortex well and spin down tremove drops from the top of a tube)

| Chemicals | Amount |
|---|---|
| Buffer 4a or 4b | 210 µL |
| Proteinase K (~8 U/µL) | 1~10 µL (8.4 µL) |

8-3: Do not physically disturb gel/sample.
8-4: Add 200 µL of Buffer 5 to each gel/sample, then incubate in a prewired humid box at 37° C. for 1~24 hours (can be done overnight).

9. Expansion 9-1: Transfer gels into dishes (you should use bigger than 60 mm dishes). Usually, cells were transferred into gels.
9-2: Add digestion buffer (2-3 ml to each sample) and incubate at room temperature for 30 min.
9-3: Fill a dish half-full with double-distilled water (milli Q water) and incubate at room temperature for 30 min.
9-4: Exchange double-distilled water (milli Q water) and incubate at room temperature for 30 min.
9-5: Exchange double-distilled water (milli Q water) and incubate at room temperature for 30 min.

Total of two hours. Samples should be shielded from light during the expansion steps. Salt makes the gels shrink, so do not add buffer containing salts, such as PBS. Exchanging water may be critical. Gels do not appear to expand well without exchanging even if samples are incubated for the appropriate length of time.

10. Post-Staining

Regular IF staining or staining by dyes can be done in this step. For example, if you would like to visualize DNA, additional DAPI staining can be performed in this step even if you stained DNA pre-expansion.

| Post-ExM DAPI Staining Composition | |
|---|---|
| Chemicals | Amount |
| DAPI 10 mg/mL | 20 µL |
| Double-distilled water (milli Q water) | 20 mL |

10-1: Remove water from expanded gel dishes 10-2: You can perform post staining without cutting gels or after cutting gels.

10-3: Add staining solution onto gels, then incubate gels for appropriate duration. For example, incubate 40~60 min with DAPI.

10-4: Wash with double-distilled water (milli Q water) at least three times.

11. Image Preparation 11-1: Remove water and add 400 µL of mounting media (Buffer 6) into the dish. When preparing Buffer 6, note that n-propyl gallate does not dissolve in water. Before adding 1M Tris and glycerol, n-propyl gallate is dissolved in DMSO. Add a stir bar and mix gently but thoroughly.

| Buffer 6: Mounting media, store −20° C. for few months | |
|---|---|
| Chemicals | Amount |
| n-propyl gallate | 0.2 g |
| DMSO | 1 mL |
| 1M Tris (pH 9.0) | 10 mL |
| Glycerol | 90 mL |

11-2: Set a silicone mold on slide grass (different size of the mold used for gelling).

11-3: Cut gels to be a similar size to the hole in a mold.

11-4: Transfer gels with mounting media into a hole of mold, then cover it by coverslips bigger than a silicone mold, and slightly push then seal all by small clips at least two opposite edges. Do not clip inside of a hole. Must clip edge of a mold. Having a mold at this step may be important to obtaining stable imaging results. Without the mold, the gels often shift during imaging and those shifted images are difficult to assess.

11-5: Imaging by appropriate light microscopy. We recommend to use an oil objective for best results.

12. Image Analysis 12-1: 2D analysis (length, area, distance) is performed by Nikon Element, Metamorph offline, and MatLab program.

12-2: 3D analysis (3D relative positions, volume, 3D distance, 3D length) is performed by Imaris Software.

Example 2. ×12 Expansion

The following text describes the protocol that was followed for Example 2. The results of Example 1 are shown in FIG. 3, where they are compared against a control.

The protocol proceeds along the same general protocol as the ×4 protocol described in Example 1. The differences will be described herein. Portions of the ×4 protocol described in Example that are not discussed here are the same in this protocol.

7. Gelling

Three following buffers are used for gelling of ~×12 ExM.

| Buffer 7: x12 ExM Monomer Solution, aliquots of 1 mL, store −20° C. for 2~3 weeks, recommend not to use if older than 3 weeks | |
|---|---|
| Chemicals | Final Concentration |
| DMAA | 1.335 g |
| Sodium Acrylate | 0.32 g |
| Double-distilled Water (milli Q water) | 2.850 g |
| Total volume | 4.5 mL |

7-1: Prepare ice bucket (with ice), attach silicone molds to glass-slides, and a humid box (pre-warmed couple of hours prior to next step).

7-2: KPS and TEMED need to be made fresh. Measure 0.018 g of KPS into a 1.7 mL Eppendorf tube.

7-3: Add 2-3 µL of TEMED in another 1.7 mL Eppendorf tube.

7-4: Thaw a frozen aliquot of Buffer 7.

7-5: Wash cells in 1 mL of PBS several times in 24 well dishes, avoiding directly contacting surfaces of coverslips to avoid removal of cells.

7-6: Gel solution-user should read all of steps 7-6a, 7-6b, 7-7, 7-8, and 7-9 before starting this step.

7-6a: Make "KPS solution" by adding 500 µL of double-distilled water in the Eppendorf tube from step 7-2. Vortex well until no particles are visible. KPS solution should be prepared as close as possible to the time when TEMED is added to the gel solution.

7-6b: Prepare Gel Solution, keeping on ice even during mixing. Gel solution includes 360 µL of Buffer 7, 40 µL of KPS solution, and 1.6 µL of TEMED (100%). The timing of this addition is important (see below). KPS solution addition should be done as close as possible to when TEMED is added. KPS should be added before TEMED and when KPS is added, the solution should be mixed well by pipetting and vortexing, and then quick spun down to remove drops from the top of a tube.

7-7: Move samples (coverslips with cells) in to prepared silicone molds (a hole within a mold) and wash with Buffer 7.

7-8: Complete the Gel solution discussed above by adding TEMED, then quickly mixing. After adding TEMED, the solution initiates gelling, so make sure that the samples are ready to receive the Gel solution.

7-9: Immediately add 70~150 µl of gel solution to each sample, then push edges of sample slips down to ensure no bubbles between glass-slide & sample. The amount of gel solution will depend on the size of molds and coverslips.

7-10: Attach a piece of parafilm (paraffin wax film) to the top of the gel solution, excluding bubbles. Exclusion of bubbles is very important, because polymerization does not occur in the presence of oxygen. However, one significant advantage of this process is that the solution does not need to be actively degassed or deoxygenation by flowing an inert gas like nitrogen through the solution.

7-11: Incubate samples in a humid box at room temperature for 2 hours.

9. Expansion 9-1: Remove gel from mold and glass slide by carefully peeling back mold and attaching non-cell side of gel against the inside of a large dish. Usually, cells were transferred into gels.

9-2: Add double-distilled water (milli Q water), ~50% of dish for first time to help with avoiding gel loss, then incubate it for 2 hours at room temperature.

9-3: Gently exchange double-distilled water (milli Q water) with 75~90% of dish, then incubate it for 2 hours at room temperature.

9-4: Gently exchange double-distilled water (milli Q water) with 75~90% of dish, then incubate it for 2 hours at room temperature.

9-5: Gently exchange double-distilled water (milli Q water) with 75~90% of dish, then incubate it overnight at room temperature.

9-6: The following day, gently exchange double-distilled water (milli Q water) with 75~90% of dish.

Samples should be shielded from light during the expansion steps. Salt makes the gels shrink, so do not add buffer containing salts, such as PBS. Exchanging water may be critical. Gels do not appear to expand well without exchanging even if samples are incubated for the appropriate length of time.

12. Reversing Expansion

In the event that you want to go back to the size of pre-expansion to take images of the same cells before and after expansion or additional staining, perform the steps that follow.

12-1: Place gels back into a dish.

12-2: Add ×1 PBS to half-fill the dish, then incubate for 30 minutes.

12-3: Replace the ×1 PBS with fresh PBS, then incubate for 30 minutes.

12-4: Repeat until the gels are a desired size.

12-5: Perform staining or imaging with compressed samples.

13. Re-Expansion

In the event that you want to re-expand the reversed/compressed samples, perform the steps that follow.

13-1: Place gels back into a dish.

13-2: Add double-distilled water (milli Q water) and replace water until the gels expand to the desired size.

14. Image Analysis

Image analysis is performed as described above in "12. Image Analysis" in Example 1.

The present invention has been described above with reference to various exemplary configurations. However, those skilled in the art will recognize that changes and modifications may be made to the exemplary configurations without departing from the scope of the present invention. For example, the various operational steps, as well as the components for carrying out the operational steps, may be implemented in alternate ways depending upon the particular application or in consideration of any number of cost functions associated with the operation of the system, e.g., various of the steps may be deleted, modified, or combined with other steps. These and other changes or modifications are intended to be included within the scope of the present invention, as set forth in the following claims.

We claim:

1. A kit for modified expanded microscopy (mExM), the kit comprising:
    a chemically and biochemically inert mold comprising an opening;
    a sealing material configured to seal to the opening of the mold and exclude visible oxygen bubbles from the chemically and biochemically inert mold; and
    instructions for use of the chemically and biochemically inert mold in an mExM method, wherein the chemically and biochemically inert mold is configured to receive a cell of interest with sufficient volume to undergo at least a 12-fold increase in cell volume of the cell of interest, wherein the instructions comprise:
        a description of an expanded microscopy (ExM) method that includes at least one method step that involves polymerization in the absence of oxygen; and
        a written or visual representation of execution of the ExM method by conducting the at least one method step that involves polymerization in the chemically and biochemically inert mold by forming a handmade seal with the sealing material and excluding visible oxygen bubbles from the chemically and biochemically inert mold upon sealing, and
    the kit further comprising a protein digestion buffer comprising sodium dodecyl sulfate and a buffering component; and about 3% paraformaldehyde in a buffer comprising PHEM or HEPES.

2. The kit of claim 1, the kit further comprising a protein digestion agent, wherein the protein digestion agent is optionally Proteinase K, the directions optionally include protein digestion agent storage instructions, and reaction conditions optionally identify a concentration range for the protein digestion agent of between 8 units per sample and 100 units per sample.

3. The kit of claim 1, wherein the instructions include reaction conditions indicating digestion can be performed at a temperature of between 25° C. and 50° C.

4. The kit of claim 1, the instructions further comprising protein digestion buffer storage instructions indicating that the protein digestion buffer maintains functionality following storage at −20° C. for at least three months.

5. The kit of claim 1, wherein the chemically and biochemically inert mold comprises silicone.

6. The kit of claim 1, wherein the chemically and biochemically inert mold comprises gum.

7. The kit of claim 1, wherein the chemically and biochemically inert mold comprises silicone or gum.

* * * * *